(12) United States Patent
Chen et al.

(10) Patent No.: US 6,797,239 B1
(45) Date of Patent: Sep. 28, 2004

(54) SPENT CATALYST DISTRIBUTOR

(75) Inventors: Ye-Mon Chen, Sugar Land, TX (US); Mahendra Sonabhai Patel, Katy, TX (US)

(73) Assignee: Shell Oil Company, Houston, TX (US)

( * ) Notice: Subject to any disclaimer, the term of this patent is extended or adjusted under 35 U.S.C. 154(b) by 725 days.

(21) Appl. No.: 09/718,690

(22) Filed: Nov. 22, 2000

(51) Int. Cl.⁷ .............................. B01J 8/24; B01J 20/34
(52) U.S. Cl. ...................... 422/144; 422/145; 502/20
(58) Field of Search ...................... 422/139, 144, 422/145, 146, 143; 502/20, 41

(56) References Cited

U.S. PATENT DOCUMENTS

| | | | |
|---|---|---|---|
| 4,150,090 A | 4/1979 | Murphy et al. | 422/144 |
| 4,595,567 A | 6/1986 | Hedrick | 422/146 |
| 4,660,768 A | 4/1987 | Bunthoff et al. | 239/423 |
| 4,980,048 A | 12/1990 | Leib et al. | 208/113 |
| 5,156,817 A | 10/1992 | Luckenbach | 422/144 |
| 5,562,818 A | 10/1996 | Hedrick | 208/163 |
| 5,635,140 A | 6/1997 | Miller et al. | 422/144 |
| 5,773,378 A | 6/1998 | Bussey et al. | 502/41 |

FOREIGN PATENT DOCUMENTS

| | | |
|---|---|---|
| BE | 638927 | 10/1963 |
| EP | 0622116 B1 | 11/1997 |
| WO | 02/42394 A2 | 5/2002 |

OTHER PUBLICATIONS

PCT International Search Report of Mar. 27, 2003.
Wilson, J. W., *Fluid Catalytic Cracking—Technology and Operation*, Chapter 4—Regenerator Design, p. 145.

*Primary Examiner*—Hien Tran
(74) *Attorney, Agent, or Firm*—Charles W. Stewart

(57) ABSTRACT

The present invention is related to methods and apparatus for improving distributions of both spent catalyst and transport gas into a regenerator of a fluid catalytic cracking unit. Spent catalyst and transport gases move upwardly through a spent catalyst riser and are diverted in a radially outward direction by a deflector cone. The catalyst and transport gas are re-mixed as they move radially outward between two disks before discharging from the outer edges (perimeter) of the distributor into the regenerator in a substantially uniform radial direction. The distributor is adapted to provide continuous discharge from its perimeter so as to cover the entire cross-section of the regenerator.

11 Claims, 5 Drawing Sheets

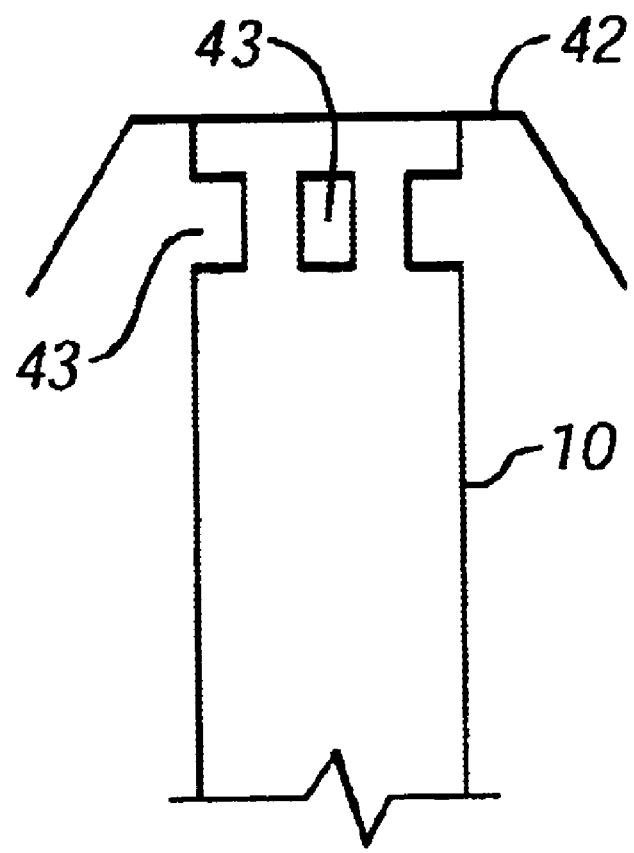
**FIG. 4
(PriorArt)**

SPENT CATALYST DISTRIBUTOR

BACKGROUND OF THE INVENTION

1. Field of the Invention

The present invention is related to methods and apparatus for improving distributions of both spent catalyst and transport gas into a regenerator of a fluid catalytic cracking unit.

2. Description of Related Art

In a typical Fluid Catalytic Cracking Unit (FCCU) consisting of a regenerator, a riser reactor and a stripper, such as that shown in U.S. Pat. No. 5,562,818 to Hedrick which is incorporated herein by reference, finely divided regenerated catalyst is drawn from the regenerator through the regenerator standpipe and contacts with a hydrocarbon feedstock in a lower portion of a reactor riser. Hydrocarbon feedstock and steam enter the riser through feed nozzles. The mixture of feed, steam and regenerated catalyst, which has a temperature of from about 200° C. to about 700° C., passes up through the riser reactor, converting the feed into lighter products while a coke layer deposits on the surface of the catalyst, temporarily deactivating the catalyst. The hydrocarbon vapors and catalyst from the top of the riser are then passed through cyclones to separate spent catalyst from the hydrocarbon vapor product stream. The spent catalyst enters the stripper where steam is introduced to remove hydrocarbon products from the catalyst. The spent catalyst then passes through a spent catalyst transfer line to enter the regenerator where, in the presence of air and at a temperature of from about 620° C. to about 760° C., the coke layer on the spent catalyst is combusted to restore the catalyst activity. The regenerated catalyst is then drawn from the regenerator fluidized bed through the regenerator standpipe and, in repetition of the previously mentioned cycle, contacts the feedstock in the lower riser.

Catalyst regeneration is a critical step in FCCU operation. The success of the step depends on the contacting efficiency between the spent catalyst and oxygen-containing gas in the regenerator. While the operation of an FCCU with a single catalyst inlet opening was acceptable for many years, the potential benefit of improving catalyst distribution in the regenerator has become apparent more recently. An ideal condition for catalyst distribution is that the time for distribution and mixing of catalyst should be less than that for coke combustion. As the regenerator diameter increases, the radial mixing time of catalyst becomes longer. At the same time, as the regeneration temperature increases, the time required for combustion becomes shorter. Hence, the benefit of improving spent catalyst distribution is more significant for an FCCU comprising a regenerator vessel of large diameter or in which regeneration is conducted at higher temperature.

Another important aspect of the spent catalyst distribution is to control afterburn, which is characterized by substantial temperature increase in the dilute phase of the regenerator. If the transport gas, most commonly air, coming along with the spent catalyst is not well distributed, gas will form large bubbles at the discharge of the spent catalyst distributor, rising quickly through the dense fluidized bed with little time for combustion, and releasing oxygen-rich gas into the dilute phase. This leads to afterburn and poor combustion efficiency of the transport gas in the dense bed.

There are a number of prior art devices using various designs to improve spent catalyst distribution in the regenerator. FIG. 4 shows a schematic drawing of a prior art spent catalyst distributor used by Assignee. It shows that spent catalyst is discharged through a plurality of discrete slots 43 on the side walls at the upper end of a spent catalyst riser 10. One shortcoming of this distributor is that catalyst exits the slots with little radial velocity, leading to insufficient catalyst distribution in the regenerator. Another shortcoming is that transfer gas is just being separated from the catalyst at the riser top and has little time to re-mix with catalyst, leading to poor usage of the transport gas for regeneration and more afterburn.

U.S. Pat. No. 4,595,567 discloses devices for distributing catalyst into an FCC regenerator in the form of an air/catalyst distribution grid at the upper end of the spent catalyst riser, which comprises a plurality of discrete openings, such as nozzles, along the length of sections of a radially extending grid. It is known that this type of distributor grid is prone to erosion damage, as discussed at p.145 of "Fluid catalytic Cracking—Technology and Operation" by J. W. Wilson.

U.S. Pat. No. 4,150,090 discloses a device comprising a spent catalyst riser axially located at the center of the regenerator, terminated by a plurality of radially extending fluidized catalyst distributor troughs discharging catalyst near the surface of the regenerator bed. The trough has a substantial U-shaped cross-section and the bottom of the trough slopes downwardly with fluidization gas injection along the length of the trough. U.S. Pat. No. 5,635,140 discloses an improvement over U.S. Pat. No. 4,150,090 with similar distribution troughs but with the improvement being that the troughs are self-aerated.

U.S. Pat. No. 5,156,817 discloses a device for supplying catalyst at the upper end of a spent catalyst riser through a plurality of channels confined by inverted v-shaped members. Catalyst is discharged downwardly along the length of the channels which are closed at their proximal end. The apparatus comprises a plurality of channels of different lengths and emanates in a fan formation from a single supply conduit, with the longest channel covering almost the diameter of the regenerator.

U.S. Pat. No. 5,773,378 discloses a device to distribute spent catalyst at the lower end of a spent catalyst standpipe. The standpipe enters the regenerator from the side wall, near the top of the bed level, conveying the catalyst through a horizontal conduit to the center of the regenerator, followed by a vertically downward conduit with a deflector plate end cap, and discharging catalyst through a plurality of discrete radial slots on the lower side wall of the vertical conduit.

EP patent 0622,116, B1 discloses a device which distributes spent catalyst by means of a central spent catalyst riser terminated with a junction connecting to multiple, horizontal conveying conduits and discharging catalyst at the ends of the horizontal conduits to discrete distribution points.

The major shortcomings of these prior art spent catalyst distributors include:

Incomplete coverage by discrete discharge—The prior art spent catalyst distributors use either a plurality of distribution arms or discrete slots from a single source of spent catalyst. In either case, the initial distribution of spent catalyst in the regenerator leaves some areas uncovered between distribution arms or discrete slots.

Poor distribution of transport gas—Prior art spent catalyst distributors pay little attention to the distribution of transport gas. This leads to poor utilization of transport gas for regeneration and more afterburn.

Bulky mechanical structure—Prior art spent catalyst distributors have long horizontal arms which are not reliable in the turbulent environment of the regenerator.

Their bulky structure also makes them difficult to fit into an existing regenerator for retrofit.

It is an objective of the instant invention to improve spent catalyst distribution in the regenerator. Another objective is to simultaneously improve the distribution of the transfer gas in the regenerator. Yet, another objective is to achieve such distributions through a simple mechanical apparatus that is compact, robust and easy to implement in an existing FCCU.

SUMMARY OF THE INVENTION

The present invention is related to methods and apparatus for improving distributions of both spent catalyst and transport gas into a regenerator of a fluid catalytic cracking unit. Spent catalyst and transport gas move upwardly through a spent catalyst riser and are diverted in a radially outward direction by a deflector cone. The catalyst and transport gas are re-mixed as they move radially outward between two disks before discharging from the outer edges (perimeter) of the distributor into the regenerator in a substantially uniform radial direction. The distributor is adapted to provide continuous discharge from its perimeter so as to cover the entire cross-section of the regenerator.

BRIEF DESCRIPTION OF THE DRAWINGS

FIG. 4 is a schematic drawing of a prior art spent catalyst distributor used by Assignee.

DESCRIPTION OF THE PREFERRED EMBODIMENTS

Catalyst regeneration is a critical step in FCCU operation. The success of the step depends on the contacting efficiency between the spent catalyst and air in the regenerator. An ideal condition for catalyst distribution is that the time for distribution and mixing of spent catalyst should be less than that for coke combustion. It is known to the art of fluidization that mixing in the vertical direction is relatively fast compared to mixing in the radial direction in a fluidized bed. The instant invention focuses primarily on improving the radial distribution and mixing.

Figure 1:
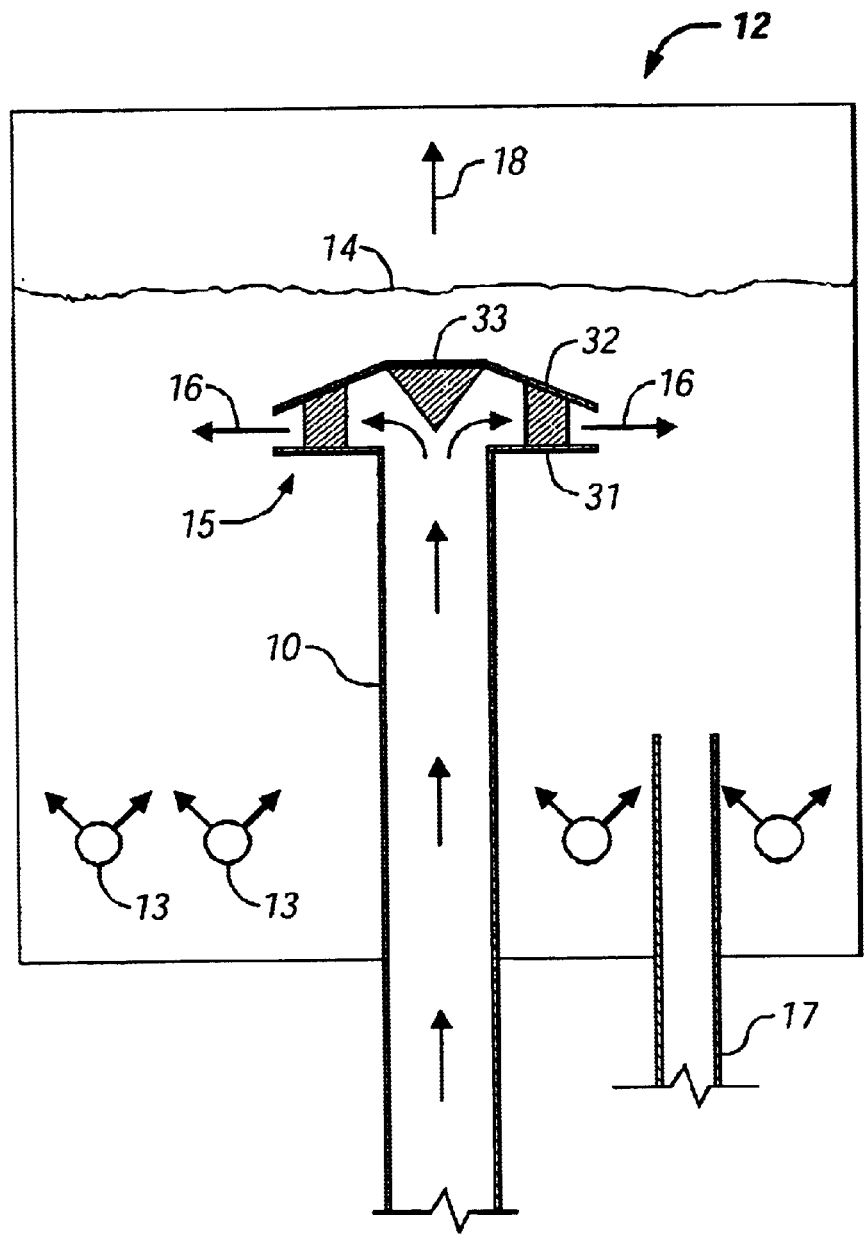
FIG. 1 shows the preferred method and apparatus for distributing spent catalyst.

FIG. 1 shows the preferred method and apparatus for distributing spent catalyst inside a regenerator in the instant invention. Spent catalyst and transport gas, most commonly air, pass upwardly through riser conduit 10 into regenerator 12, having a plurality of air distribution rings 13 and forming a fluidized bed level or fluidized bed 14. Spent catalyst and transport gas pass upwardly to the upper end of conduit 10 and exit together through distributor 15, below the fluidized bed level 14, in a substantially uniform radial direction as shown by the arrows 16. Both spent catalyst and transport gas mix rapidly in the radial direction within the fluidized bed 14 to start the regeneration process. Combustion gas exits the fluidized bed 14 through the upper part 18 of the regenerator 12 and the regenerated catalyst exits through conduit 17.

Figure 2:
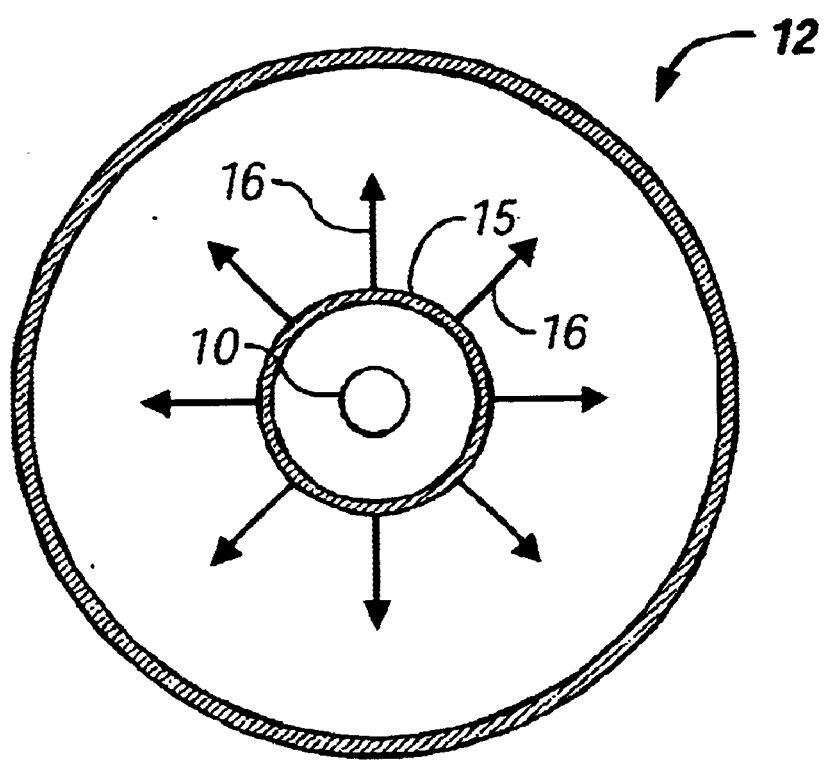
FIG. 2 shows the top view of the preferred method and apparatus of FIG. 1.

FIG. 2 shows the top view of the preferred method and apparatus of FIG. 1. Spent catalyst and transport gas rise through conduit 10 and exit at the perimeter of distributor 15 in a substantially uniform radial direction 16. Distributor 15 is adapted to provide continuous circumferential discharge from its perimeter and to cover the entire regenerator 12 as will be described below.

Figure 3A:
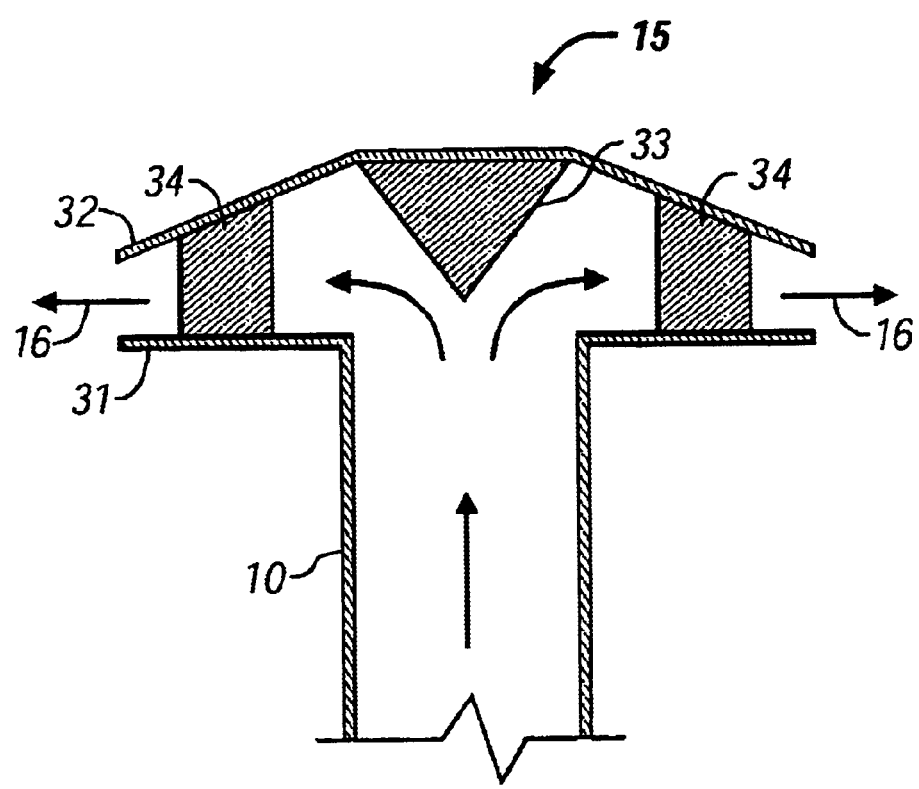
FIGS. 3A and 3B show details of one preferred embodiment of a spent catalyst distributor.
Figure 3B:
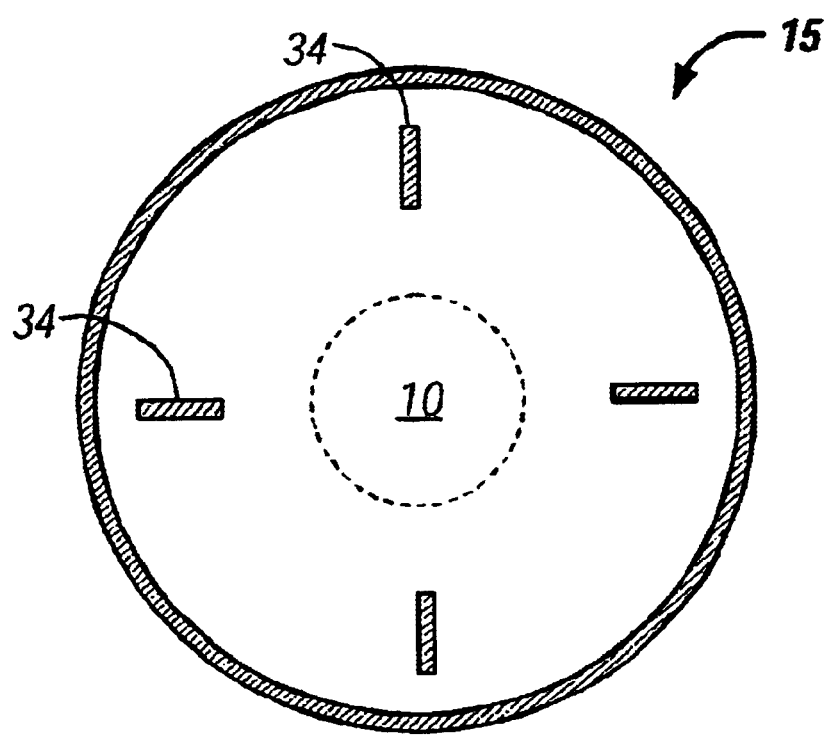

FIGS. 3A and 3B show details in a side view and a top view, respectively, of a preferred embodiment of the distributor 15 as shown in FIGS. 1 and 2. Distributor 15 includes a lower disk 31 and an upper disk 32. The diameter of the disks 31, 32 which form distributor 15, is small compared to the diameter of regenerator 12. The diameter ratio of distributor/regenerator could range from 0.10 (10%) to 0.50 (50%), but is preferably in the range of 0.20 (20%) to 0.35 (35%). Lower disk 31 is rigidly connected to conduit 10. Although disk 31 is shown as being horizontal, it can also tilt either upwardly or downwardly. The range of this tilt angle may be from about 30° upward to about 30° downward from horizontal, but is preferably in the range of about 15° upward to about 15° downward from horizontal. Upper disk 32 is rigidly connected to lower disk 31 by a plurality of spacers 34. Although disk 32 is shown as being tilted downward, it can also tilt upward. The range of this tilt angle may be from about 30° upwards to about 45° downward from horizontal, but is preferably in the range of about 10° upward to about 30° downward from horizontal. Although the diameter of disk 32 is shown in the drawings to be about the same as disk 31, the ratio of the two diameters can be in the range of about 0.8 to about 1.25. Spacers 34 are preferably terminated before reaching the perimeter of distributor 15, as shown in FIG. 3B. This allows the catalyst and transfer gas to re-merge after passing spacer 34 to fill the gap again. Thus, distributor 15, in the preferred embodiment of FIGS. 3A and 3B, is adapted to provide a continuous, and substantially uniform, discharge of catalyst and transport gas from its perimeter so as to cover he entire cross-section of regenerator 12. If, however, spacers 34 are extended to the perimeter of distributor 15, the basic design of distributor 15 still works except that a small portion of the regenerator is not covered. Upper disk 32 also includes a deflector cone 33 rigidly connected at the center of disk 32. The diameter ratio of deflector cone 33 to riser conduit 10 may range from about 0.30 (30%) to about 1.00 (100%), but is preferably in the range of 0.40 (40%) to about 0.80 (80%). The mixture of spent catalyst and transport gas passes upwardly through conduit 10 and is diverted in a substantially uniform, radially outward direction by deflector cone 33. The function of deflector cone 33 is to assist the change in flow direction. The basic design of distributor 15 can still work without deflector cone 33, but the re-mixing of catalyst and transfer gas in between the two disks will be less efficient, and overall pressure drop through the distributor 15 will be higher.

As known in the art of fluidization, some degree of separation between catalyst and transport gas occurs due to the sudden change of flow direction from the vertically upward direction to the radially outward direction at the upper end of conduit 10. The velocity of the catalyst is also reduced due to the change in flow direction. The preferred embodiment, shown in FIGS. 3A and 3B, allows the catalyst to be re-accelerated by the transport gas in the space formed between upper disk 32 and lower disk 31 as the catalyst and the transport gas move radially outward together before discharging from the perimeter of distributor 15 into the regenerator fluidized bed 14.

The re-acceleration of the catalyst and the re-mixing of catalyst and transport gas between the two disks are critical. Because distributor 15 has a relatively small diameter, it relies on the substantially radial jetting of the discharge from the perimeter of distributor 15 to distribute the spent catalyst and transport gas into the regenerator 12. It was found that the re-acceleration process allows the catalyst to regain momentum in the radial direction before exiting distributor 15. This allows the catalyst to be discharged to a substantial distance from distributor 15, thus providing essentially uniform coverage of the regenerator 12. It was also found that the transport gas is re-dispersed by the catalyst during this re-acceleration process, thus making bubbles smaller at the exit point (perimeter) of distributor 15. Both spent catalyst and transport gas exit the distributor 15 in a radial direction with substantial momentum. This improves the radial mixing of spent catalyst and transport gas in the regenerator fluidized bed 14. The combined effect of smaller bubbles and faster mixing improves the effectiveness of transport gas usage for regeneration. If the transport gas is separated out at the upper end of conduit 10 and does not re-mix with catalyst, large bubbles will form at the perimeter of distributor 15. Since large bubbles rise very fast, oxygen in the transport gas would have very little time for combustion within the regenerator fluidized bed 14. This reduces the effectiveness of transport gas usage for regeneration, and the release of the oxygen-rich gas above bed level 14 leads to afterburn.

From the discussion above, it has been clearly demonstrated that the preferred method and embodiment of the instant invention provide several advantages over the prior art spent catalyst distributors, to wit:

Full coverage by continuous discharge—The instant invention is adapted to provide a continuous, substantially uniform, circumferential discharge from the perimeter of the distributor 15 so as to cover the entire regenerator 12 cross-section. The prior art spent catalyst distributors use either a plurality of distribution arms or discrete slots. In either of these cases, the initial distribution of spent catalyst can only cover a portion of the regenerator, leaving the remaining portion of areas uncovered between the distribution arms or discrete slots.

Distribution of the transport gas at the same time—The transport gas is re-mixed in distributor 15 before exiting at the perimeter thereof. This makes bubbles smaller at the exit point (perimeter) of distributor 15 and improves the combustion effectiveness of transport gas and reduces afterburn.

Fast radial mixing in the regenerator fluidized bed—Both spent catalyst and transport gas exit distributor 15 in a radial direction with substantial momentum. This improves the mixing of spent catalyst and transport gas in the regenerator fluidized bed 14, and improves the combustion effectiveness of the transport gas.

Compact mechanical structure—The preferred embodiment of the instant invention has a relatively small diameter. It has a robust, compact structure which is easy to install in most regenerators. Prior art distributors have long horizontal arms which are not reliable in the turbulent environment of the regenerator. Their bulky structure also makes them difficult to fit into an existing regenerator for retrofit.

The instant invention of the spent catalyst distribution system shown in FIGS. 3A and 3B was installed in one of Assignee's FCCUs, replacing a prior art distributor having a design as shown in FIG. 4. Spent catalyst and transport gas are shown in FIG. 4 to pass upwardly through conduit 10 which is terminated with end cap 42. Spent catalyst and transport gases are discharged through a plurality of slots 43 on the side-wall of conduit 10 at its upper end.

The results are shown in the following example.

ILLUSTRATIVE EMBODIMENT

The following illustrative embodiment is for illustrative purposes only and is not intended to limit the scope of the invention in any way.

In the following illustrative embodiment, performance tests were conducted on a regenerator before and after the installation of one embodiment of the spent catalyst distributor of the present invention according to FIGS. 3A and 3B. FIG. 4 shows the prior art spent catalyst distributor that was replaced with an embodiment of the present invention. Table 1 below shows a comparison of some performance parameters before and after the installation.

TABLE 1

| Performance Parameter | BEFORE | AFTER |
|---|---|---|
| Wt. % CRC (carbon on regenerated cat.) | 0.17 | 0.13, a decrease of 24% |
| Supplemental oxygen feed rate | 200 ton/day | 55 ton/day, a decrease of 73% |
| Pressure drop in spent catalyst riser and distributor | P psi | (P − 0.75) psi |
| Catalyst to Oil ration | 7.0 | 6.5, a decrease of 7% |
| Calculated regenerator effectiveness factor | E % | (E + 25) %, |

Benefits of improved distribution of spent catalyst and transport gas in the regenerator can be utilized advantageously in numerous ways. In the above illustrative embodiment, the operator was able to run the regenerator with substantially less supplemental oxygen and reduce the carbon on the regenerated catalyst, while maintaining the required coke burning capacity. Both of these advantages bring substantial economic benefits to the operator. Reducing pressure drop in the spent catalyst riser and distributor is desirable so as to keep the load on the spent catalyst transport gas blower from increasing. Reducing the catalyst-to-oil ratio enables an operator to process more barrels of oil for every pound of catalyst circulating in the fluid catalytic cracker. Overall, the calculated effectiveness of the regenerator in burning coke was improved by 25% the use of the method and the embodiment of the present invention.

What is claimed is:

1. A spent catalyst distributor for use in a regenerator of a fluid catalytic unit comprising:
   a conduit, having an opening which terminates in said regenerator, for introducing a mixture of spent catalyst and transport gas into said regenerator;
   a first disk surrounding said opening of said conduit at the uppermost end of said conduit in said regenerator;
   a second disk, spaced upwardly from, and rigidly connected to, said first disk, thereby forming a substantially open space therebetween;
   a deflection cone attached, at its base, to said second disk, said deflection cone pointing downward and being centered over the outlet of said conduit, said deflection cone adapted to direct said spent catalyst and said transfer gas in a substantially uniform, radially outward direction through said space formed between said first disk and said second disk, thereby providing a continuous circumferential discharge of said mixture of said spent catalyst and transport gas from the outer circumference of said space formed between said first disk and said second disk into said regenerator in a substantially uniform radially outward direction.

2. The distributor of claim 1 wherein said first disk is horizontal.

3. The distributor of claim 1 wherein said second disk is horizontal.

4. The distributor of claim 1 wherein said first disk is inclined at an angle ranging from 30° upward from said horizontal position to 30° downward from said horizontal position.

5. The distributor of claim 4 wherein said first disk is inclined at an angle ranging from 15° upward from said horizontal position to 15° downward from said horizontal position.

6. The distributor of claim 1 wherein said second disk is inclined at an angle ranging from 30° upward from said horizontal position to 45° downward from said horizontal position.

7. The distributor of claim 6 wherein said second disk is inclined at an angle ranging from 10° upward from said horizontal position to 30° downward from said horizontal position.

8. The distributor of claim 1 which is within said regenerator and wherein the ratio of the diameter of said first, disk to the diameter of said regenerator is in the range of 0.10 to 0.50.

9. The distributor of claim 8 wherein the ratio of said diameter of said first disk to said diameter of said regenerator is in the range of 0.20 to 0.35.

10. The distributor of claim 1 wherein the ratio of the diameter of said first disk to the diameter of said second disk is in the range of 0.80 to 1.25.

11. The distributor of claim 1 wherein the ratio of the diameter of the base of said deflector cone to the diameter of said conduit is in the range of 0.30 to 1.00.

* * * * *